Fig. I.

INVENTOR.
John D. Russell

INVENTOR.
John D. Russell
BY Mann & Jungaraithis

United States Patent Office 3,371,516
Patented Mar. 5, 1968

3,371,516
APPARATUS FOR ADJUSTING THE TEMPERATURE COEFFICIENT OF WIRE STRAIN GAGES
John D. Russell, Malibu, Calif., assignor to Microdot Inc., South Pasadena, Calif., a corporation of California
Original application June 15, 1960, Ser. No. 36,304, now Patent No. 3,245,016, dated Apr. 5, 1966. Divided and this application Sept. 15, 1965, Ser. No. 505,207
6 Claims. (Cl. 73—1)

This application is a division of U.S. application Ser. No. 36,304 filed June 15, 1960, now U.S. Patent No. 3,245,016.

The present invention relates to improvements in inherently compensated strain gages and to methods for producing the same. More particularly, the invention relates to temperature compensated weldable strain gages; gages which when mounted on a test specimen which is free to expand, will be substantially insensitive to changes in temperature, thus having a very low or zero resistance change with such variations in temperature. The invention further relates to methods for preparing the improved and inherently compensated wire-strain gages described herein.

Resistance wire-type strain gages as originally known were characterized by undue sensitivity to temperature variations. In early research and study with these gages the temperature variations were not considered unduly significant for many purposes and thus while temperature compensation was considered desirable, it was not immediately considered critical. However, as the possible areas of utility of such gages were more fully explored, the realization of the difficulties inherent in adapting these initially devised gages for new uses was had. Too, in more recent years an increased demand for gages providing compensation for temperature changes has become necessary by virtue of the testing and development of devices in the rocketry and missile fields, where rapid variations of hundreds or even thousands of degress are encountered.

The need for temperature compensation of strain gages also arises from physical factors inherent in the gage itself. Thus, the resistance of most materials used in such gages varies with temperature; and a second temperature variable is introduced where the thermal coefficient of expansion of the strain gage wire is different from that of the structure to which it is bonded.

A form of temperature compensation has been attained heretofore in certain instances by installation of a second strain gage, often known as a dummy gage, on an unstressed piece of the same metal as that to which the active strain gage is bonded. If the two pieces of metal are subjected to the same temperatures during testing, compensation is provided for thermal resistance changes in both the test and the dummy gages, for some purposes, even though the active and dummy gages are not inherently compensated. This will be true whether resistance changes occur due to the thermal coefficient of the wire in the gage or to the differential expansion existing between the gages and the metal to which they are bonded. It is noted that this will be true even though both gages have a relatively high sensitivity to temperature, so long as they have the same sensitivity, and, as noted above, are subjected to identical temperatures since the overall effect is cancelled out in the bridge circuit.

Thus, it will be evident that the dummy gage technique does not provide a temperature compensated gage, but rather a temperature compensated system and bridge circuit composed of two or more matched uncompensated gages.

However, merely employing an extra, or dummy, gage in an adjacent leg of a Wheatstone bridge circuit or modification thereof, in addition to being cumbersome is not enough to ensure complete or even adequate temperature compensation under the increasingly severe test conditions now extant. Thus, full temperature compensation requires that both strain gages, the active and the dummy be attached to the same structure, and be located as nearly adjacent as possible. Nor will this precaution suffice even in the most standard operating conditions if the two strain gages do not have identical thermal coefficients of expansion, resistance change and the same gage factor; the gage factor being the dimensionless relationship between change in gage resistance and change in length, or strain. Gage factor is, specifically, the measure of the amount of resistance change for a given strain and is thus an index of the strain sensitivity of the gage.

In any event, the dummy gage method of temperature compensation is inadequate and ineffective where rapid and wide variations in temperature are encountered; for the test or active gage and dummy gage in such environments cannot be located in such a manner as to guarantee that the temperatures of the two gages, dummy and test, will be the same under mounted test conditions. Illustratively, if the strain on the skin of a missile is to be measured during re-entry into the atmosphere, the dummy gage cannot be placed directly on the skin because it will sense strain introduced by stress. Further, if the dummy gage were placed in adjacent parallel relation to the test or active gage, it would cancel the reading of the active gage, assuming the latter gage is connected to a bridge circuit, to cancel the temperature effects referred to above. Thus, any high stress or strain in the metal of the missile surface or skin, for which purpose the active gage is applied thereto, would, of necessity be undetected. Placing the dummy gage at right angles to the active strain gage on the missile surface is also ineffective, since unlike a simple tension link, the stresses exerted are complex, and the combined strain in the two divergent directions of stress would induce a single signal of meaningless import, it being unknown as to which of the gages provided which proportion of the total signal transmitted.

It should also be noted that even if the dummy gage could be placed on the missile surface in close physical proximity to the active gage, there would still result significant differences in temperature between the two gages induced by rapid temperature changes and/or variable dissipation caused by underlying structural members. Nor is it practical to attach a dummy gage to a separate unstressed plate of the same metal as that of the test strain gage in the same bridge circuit since attachment to the exterior skin or surface of the missile without making the dummy gage an integral part thereof would result in its subjection to high-velocity passage through the atmosphere and resulting temperature variations widely divergent from those of the test gage. Similarly and obviously no benefit is to be derived from locating a dummy gage within the missile while the test gage is attached to the missile skin.

The above references are illustrative of the existing problems in these fields for which the dummy gage technique is unable to provide the necessary solutions. It will be obvious to those skilled in the art that the problem of temperature compensation under test conditions and related problems as well, also exist in many other areas, such as for example, in the strain measurement of metals employed in jet propelled aircraft which are capable of such rapid acceleration and high speeds causing rapid and significant temperature and pressure variations as well as sustained elevated levels thereof in the metal of the plane surface due to air friction and the like; in the construction of jet and rocket engines; and indeed normally wherever substantial and rapid temperature gradients occur.

Hence, in view of the ever increasing severity of test conditions and the inability of the dummy gage technique to provide temperature compensation operative under these conditions, the attainment of an accurate and efficient inherently compensated wire strain gage has evolved into a most significant endeavor.

It should be noted that even in standard, less severe environments where the dummy gage technique referred to above can be employed to better advantage, its effectiveness as an accurate measure of strain is markedly enhanced by substitution therein of inherently compensated gages which provide less "scatter" in temperature sensitivity than gages selected merely as identical in structure and which possess a low temperature sensitivity unlike identically constructed test and dummy gages each of which manifests an elevated temperature sensitivity.

While the inherently compensated gage can always provide, it is observed, an improvement in the accuracy of a dummy gage system, employment of the dummy gage system known heretofore will not improve the accuracy of the measure derived from use of an inherently compensated wire strain gage. Indeed, where the dummy gage and active gage temperatures are widely divergent, a circumstance which can so readily occur in the increasingly severe conditions of test and development studies, the added number of variables resulting would succeed only in introducing error into the measurements obtained by virtue of such ill advised usage.

Inherently temperature compensating wire strain gages, often referred to as self-temperature compensating, have been known heretofore. These have been of the bonded variety wherein the resistance wire is bonded by means of cement, glue, cellulose, Bakelite resin or a similar adherent material to the surface of a sheet of insulating material such as paper. The paper insulating support is, in turn, bonded to the test specimen in which strain is to be measured. In these gages the fine wire resistance filament is disposed as a grid and composed of two different materials; for example, a copper-nickel alloy and nickel connected in series. The lengths of the two different wire materials are proportioned so that the total increase in resistance with temperature, due to both the coefficients of resistivity and thermal expansion, of one material, e.g. copper-nickel alloy, is to a large extent cancelled by a decrease in the resistance of the other material, e.g. nickel. Since the temperature coefficient of expansion varies with different materials, it is, of course, necessary to select the proper gage for the material being tested. Gages of this type are presently used on materials having the temperature coefficients of expansion of annealed mild steel and 24ST6 duraluminum. Illustratively, a difference in coefficients of expansion of $1 \times 10^{-6}$ per degree Fahrenheit (per deg F.) results in a gage indication of 1 micro-inch per inch per deg F. One difficulty inherent in these gages has been their limitation for use within comparatively narrow temperature ranges in terms of the test conditions where stress gages are used or needed. Thus, these gages are excluded from use for the majority of demanding test procedures employed in the fields of aerodynamic, jet, missile and rocketry research and development. Illustrative of the temperature ranges within which these compensating strain gages known heretofore are purported to have some value are $+50°$ F. to $+250°$ F. and from $-50°$ F. to $+300°$ F. From curves purporting to further characterize these gages it appears that the margins of error embraced within the narrower range may be as much as 50 micro-inches per inch while for the broader range recited the error may extend to in excess of 300 micro-inches per inch. Temperature use limitations are also introduced by the nature of the bonding material employed. A still further difficulty with this type of gage is that once manufactured the gage cannot be readily or conveniently adjusted; nor can it be given an accurate unmounted sensitivity calibration; nor indeed can a check on temperature compensation or temperature sensitivity be effected after mounting thereof on a specimen to be tested, in most instances. Thus, there is no accurate correlation between unmounted and mounted sensitivities.

It will, for example, be evident that temperature compensation of a strain gage cannot be accurately determined after it is mounted on a complex test specimen where the degree of restraint with temperature change is a complex and normally indeterminable factor. Thus, if the test specimen is temperature calibrated after gage installation the gage resistance change may be due to one or a plurality of strains; e.g. to strains induced by free expansion or strains caused by thermally induced stresses; with no means for determining which proportion of the measured signal is caused by one or another of these strains.

Thus, in accordance with the present invention there is provided an inherently temperature compensated wire filament weldable strain gage wherein temperature compensation and calibration have been reliably and accurately introduced prior to mounting of the gage on a metal piece or test specimen; thus effecting the preparation of a gage which more efficiently measures strains occasioned by stresses introduced into test specimens whether these stresses are induced by thermal effects, as where a metallic test piece is restrained, in which case the gage is desirably sensitive to temperature modification; where such changes cause a stress on the piece or structure tested; or where these stresses on the test specimen are introduced by pressure, force, acceleration or the like.

To accomplish these and other objectives of the present invention there is provided a wire strain gage which, when mounted on a test specimen which is free to expand, will have a very low or zero resistance change with changes in temperatures; in effect, a gage made insensitive to strain or elongation; a state attained only in a gage wherein the metal expands freely with increasing temperature.

Such strains, referred to as free thermal expansion strains are not, however, the only factors required to be eliminated or cancelled in order to provide a meaningful temperature compensated gage. Other and interrelated factors upon which temperature compensation depends are the thermal coefficient of resistivity and the thermal coefficient of expansion of the wire.

These factors, noted to illustrate the selectivity and delicacy of the problems inhering in formulating a gage of dependable mounted sensitivity prior to mounting, can, however, be counteracted by altering the thermal coefficient of resistivity or the thermal coefficient of expansion of the wire filament of the gage. Attempts to provide a compensated gage by balancing of these factors has been attempted heretofore. However, a practicable basis for effecting this on individual gages has not been known hitherto. Thus, the known procedures employ a batch or spot system of selection. This practice involves selection of a spool of wire sufficient to form a large number of gages with a supposed correct coefficient of resistivity, from which a batch of gages theoretically compensated for a metal with a particular coefficient of expansion is then formed. This procedure has been found, however, to introduce a very large and significant amount of error, for there exists a surprisingly intolerable scatter or variation in the actual sensitivities of the gages made from even the most uniformly constituted spool or similar length of wire. Thus, the differences in sensitivity between two or more gages so constructed and prior to mounting thereof on a test specimen have been found to be as much as 1000 micro-inches per inch of apparent strain for a temperature change of 500° F. This would correspond to an erroneous stress measurement of approximately 30,000 p.s.i. in steel. Thus, these batch systems known heretofore when employed with the bonded gages, prepared as described above, result in compensating gages with an intolerable scatter or variation over any temperature range akin to that which they would experience in modern test conditions. A further disadvantage resides in the fact that these bonded gages cannot be readjusted for another test material once they have been prepared, even were no scatter inherent therein. This is most commonly due to the method of bonding of the wire filament to its support and the bonding of the support itself to the test specimen. Thus the adherent or bonding agent has only a limited tolerance for variations in temperature before attaining a final set which cannot be disturbed without destroying the usefulness of the gage and indeed the gage itself.

The present invention provides, therefore, a weldable resistance wire filament strain-gage duly and accurately calibrated and compensated for temperature prior to its mounting for use on a test specimen; a gage which, in addition, can be readjusted in its temperature compensation repeatedly should it be decided to use a particular gage or plurality thereof with test material other than that for which it was originally prepared. Further, it is feasible in accordance with the present invention to check on the sensitivity of each individual gage prepared prior to removal thereof from the calibration and adjustment device and thus, of course, prior to mounting thereof in a test procedure. Still further, the adjustment, readjustment and calibration of individual gages is accomplished, in accordance herewith, in a manner both rapid and economically practicable.

It will be apparent, however, that it is also feasible, although unnecessary, to employ a batch system in the preparation of the temperature compensated strain gages of the instant invention whereby a spool of wire having an announced thermal coefficient of resistivity may have imparted thereto an average sensitivity irrespective of the intolerable scatter which occurs, so that the fine adjustment in sensitivity required by the individual gage subsequently will be held to a minimum, even though adjustment can be made over a wide range. In this manner too, some of the gages of the batch may even attain the desired sensitivity. The remaining gages of the batch or group can then be individualy adjusted; a procedure which could not be performed with the temperature compensated gages employed heretofore.

In general, the gages calibrated and compensated for temperature and used in the practice of the present invention are the weldable strain gages described in copending United States patent application Ser. No. 754,956 filed Aug. 14, 1958, by the inventor herein and of which the present application is a continuation-in-part. These gages are adapted for coupling or attachment to the test specimen without the use of temperature sensitive adherents. These gages have the further advantage of being well adapted for use under extreme temperature conditions as well as for use at ambient temperatures. Further, the gages of the invention are well suited for use with test specimens having curved or irregular surfaces and are, in addition, attachable to the test specimen in such a manner as to effect a strain responsive coupling over the entire length of the resistance filament contained within the gage, and most significantly, without the use of cements or other sensitive bonding materials. Thus, these strain gages can be welded to the test specimen, either by application of normal arc welding techniques or by means of sonic welding.

In generalized form, the gages employed herein comprise a resistance wire or strain-responsive filament carried by a supporting element, such as an external housing of metal, and mechanically locked to the supporting element by means of a dense mass of insulating materials in such fashion that longitudinal changes in the dimension of the supporting element caused by deformation of a test specimen to which it is attached are imparted to the resistance wire or filament via the mass of insulating material. Thus, for example, the insulating material may be a compactible or compressible solid possessing both thermal and electrical insulating properties, which is deposited around the filament and enclosed within a metallic tube permanently deformed, as by drawing, crimping, etc., to exert a compressive force on the insulating material, thereby forcing it into firm compressive contact against the resistance element and effectively frictionally coupling the element to the external tube. Accordingly, with the tube attached along its entire length to a test specimen, strain applied to the tube from the test specimen is transmitted through the insulating material and hence to the resistance element contained therein.

The external housing of the gage is formed of a freely-yielding or deformable material such, for example, as thin sheet steel, stainless steel, platinum, aluminum, tungsten, tungsten alloys, etc., which is readily adaptable for rigid bonding, as by welding, to a metallic test specimen. In this manner, the gage can be securely fastened to a test specimen very quickly without the necessity of waiting for a bond to set or cure as in the conventional types of bonded gages referred to hereinabove. The unique structural characteristics of the gage permit its being mounted by welding over its entire length to either a flat or curved surface and without danger of damaging or shorting in the internal resistance wire or filament which is electrically insulated from the housing by the surrounding mass of insulating material, and also render the gage adaptable for high temperature measurement work due to the thermal insulating properties of the assembly, as well as measurement work performed under ordinary or ambient conditions of temperature.

In order that the invention may be readily understood reference is had to the accompanying drawings, forming part of this specification, and illustrating, by way of example, certain apparatus embodying the invention and by which the method of the invention is carried out. In these drawings.

Figure 1:
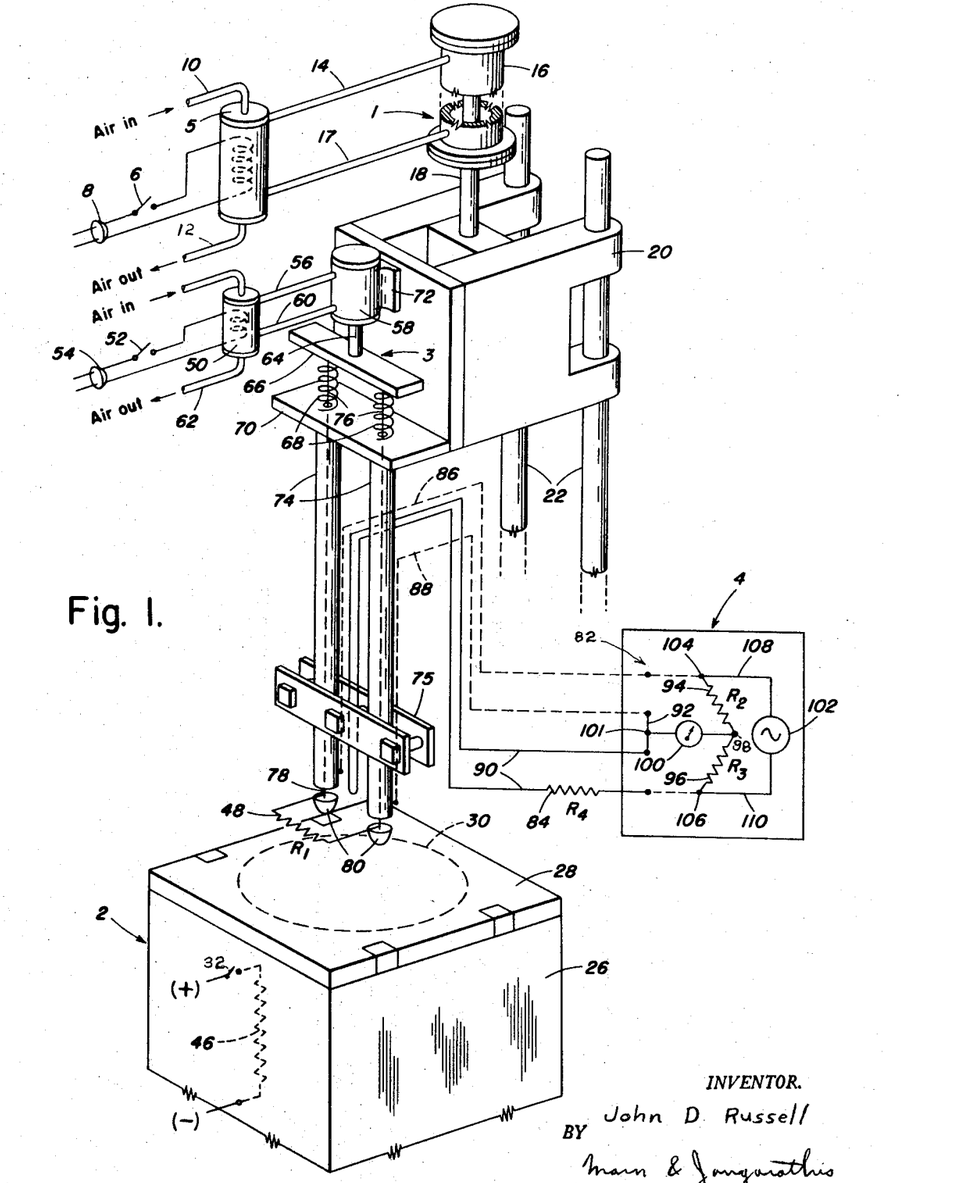
FIGURE 1 shows in a view which is partly elevational and partly schematic the gage sensitivity adjusting and measuring system of the present invention.

Referring with greater particularly to the drawings, FIGURE 1 illustrates means for effecting calibration and adjustment of temperature compensated wire strain gages, and comprises the circuit arrangement and apparatus employed for this purpose. The system shown may be viewed for convenience as composed of four components which comprise an oven-immersion or dunking means indicated in its entirety by the numeral 1; an oven heating means indicated broadly by the numeral 2; a gage clamping or engaging means 3 and a gage sensitivity measuring assembly 4.

Treating of these component assemblies and their interrelation predominantly in sequence, the oven-immersion device 1 comprises a solenoid actuated air-valve 5 which is energized by closure of the switch 6 connected to a current source by means of the cord and plug 8; and which is provided with an air inlet 10 and an air vacuum outlet 12. When the switch 6 is closed the solenoid air valve 5 is opened to admit air which is conducted thereto from an air supply (not shown) through the inlet 10. The open valve means 5 passes the air through the air supply duct 14 to the long stroke air cylinder 16 which provides pressure to push the piston rod 18 downward; one end of said rod 18 being disposed in slidable engagement within said cylinder. During this operation line 17 is open through the air duct 12 to the atmosphere. The rod 18 is attached at its alternate end to the carriage assembly 20, and in the downward movement of the rod 18 impelled by the air pressure within the cylinder 16, the carriage 20 is forced downwardly also on the guideways 22 with which the carriage 20 is in slideable engagement. In this manner the clamping means 3 attached to the carriage 20 is also moved downwardly and into the oven 26; the cover 28 of said oven 26 being moved by suitable means to an open position, simultaneously with the downward movement of the rod 18, the carriage 20 and the clamping means 3. The cover 28 is mounted on the oven 26 in such a manner as to slide in a horizontal plane in opening and closing of the gage immersion port 30 (indicated by a dotted line) through which the clamping means 2 passes to and from the oven 26. The heating element 46 and oven 26 as well as the gage clamping means 3 are formed of a material which is nonreactive at the elevated temperatures which the oven 26 is capable of attaining, i.e. 2000° F. The temperature of the oven 26 is maintained at the desired level by suitable and conventional means which may include a monitoring thermocouple (not shown) disposed within the aforesaid oven 26.

A plurality of ovens or a single oven with a plurality of partitions may be and is most desirably employed for heating of the gage filament. In this procedure the individual ovens or partitions are erected to function at three different temperature ranges. Each oven or partition may, in turn, be supplied with an oven immersion system so that the gage to be adjusted may be moved from one system to another as it becomes desirable to use a particular oven or partition having a particular temperature range. Alternatively, a single immersion assembly may be employed, which can be moved from oven to oven, or partitiion to partition or the appropriate oven or partition moved under the assembly. By this arrangement, there would be available, illustratively, a heating unit, e.g. an oven or partition of an oven, having a temperature of approximately 600° F. to be used for checking the temperature sensitivity of a gage as will be discussed hereinafter. In this instance the gage could be immersed in the heating unit from room temperature to 600° F. A second heating unit would be set at a temperature of 850° F. to be used for immersion of a gage therein when a lowering of temperature sensitivity is desired, as will be elaborated upon in detail subsequently. A third oven on the other hand, would be set at 1100° F. or higher, as also described elsewhere herein, and be used to heat the gage and gage filament to elevate the temperature sensitivity thereof.

Opening of the switch 6 results in the passage of air pressure through air ducts 10 and 17 to the lower end of the air cylinder 16, while air lines or ducts 12 and 14 are vented to the atmosphere; thus exerting an upward pressure and lifting action on the head of the rod 18. As a result the piston rod rises in the cylinder 16 lifting the carriage 20 and the clamping means 3 attached thereto. In this manner that portion of the clamping means 3 remote from the carriage 20, in which the gage 48 is removably mounted is withdrawn from the oven 26. As the clamping means clears the port or orifice 30 in its upward passage the cover member 28 of the oven 26 is returned to its closed position over the orifice 30 and the switch 32, if desired, is returned to its open position, thus de-energizing the resistance element or a plurality of resistance elements illustrated at 46 in the oven 26.

The clamping or gage mounting means 3 provides for insertion of the gage 48 in position in the bridge circuit of the gage sensitivity measuring assembly 4 to be described in detail hereinafter and wherein the gage 48 to be adjusted constitutes the resistance $R_4$.

The clamping means 3 comprises a solenoid 50 which is energized by closure of the switch 52 connected to a current source by means of the cord and plug 54. When so energized, air pressure, illustratively in the order of one hundred pounds per square inch (p.s.i.) is passed from an air supply (not shown) by means of the air inlet 55 through the solenoid air valve 50 and the air line 56 to the air cylinder 58. When de-energized by opening of the switch 52, the air valve inlet 50 is closed and the unrenewed air in the cylinder 58 is simply bled off through the air duct 60 and the solenoid air valve 50 into the air outlet 62. The air cylinder 58 when receiving air under pressure from the solenoid 50, forces the piston rod 64 slideably mounted therein, downwardly, thus forcing the spring-biased cross-member 66 affixed to the opposite and lower end of the air cylinder 58 downwardly as well. The cross-member 66 compresses the spring elements 68 positioned between the aforesaid cross-member 66 and the anchor bar 70. The latter member 70 and the air cylinder 58 are mounted in fixed relation to the carriage 20 of the oven immersion system 1. The air cylinder 58 is affixed to the carriage 20 by means of the bracket member 72. Tubes 74 are affixed at their upper ends to the anchor bar 70 and are positioned in spaced substantially parallel relation to each other. They are, in addition, suspended downwardly from the anchor bar 70 and have an insulated cross-brace 75 provided across their lower free ends. The orifices of the tubes 74 are continuous with orifices 76 defined in the anchor bar 70; each tubular orifice and its anchor bar orifice extension 76 presents a passage for each of the wire members 78 which are attached to the under surface of the aforesaid cross-member 66, on the side opposite the attachment thereof to the piston rod 64; the upper terminal end of each of said wires 78 being affixed to said cross-member 66 at a position directly above each of the orifices 76. Attached to the terminal ends of these wire members 78 which are extended beyond the free lower ends of the tubes 74 are the expanded pads or clamps 80. These latter members 80 cooperate with the periphery of the free end of each of the aforesaid tubes 74 to removably engage and hold the opposite ends of a strain gage 48 to be adjusted according to the practice described herein when the switch 52 is open and the spring-biased cross-member 66 and the piston rod 64 are at rest in an elevated position. Thus, energizing the solenoid air valve 50 and air cylinder 58 by the closure of the switch 52 effects lowering of the rod 64, the cross-member 66 and consequently the wire clamp supporting wires 78 and clamps 80 to cause release of the gage (48) ends from between the clamps 80 and the cooperating free ends of the tubes 74.

When mounted in the clamped position as described, the gage 48 constitutes the resistance $R_1$ of the bridge circuit of the gage sensitivity measuring system 4. The remaining portion of the bridge circuit and measuring system 4 is composed broadly of an SR-4 (a tradename) strain indicator 82, manufactured by the Baldwin-Lima-Hamilton Corporation; a dummy gage resistance element 84; the conductors 86 and 88 to the opposite terminals of the gage 48 undergoing adjustment when the clamping system 3 and gage 48 are lowered into the heated oven 26; and the compensating lead wire 90 a portion of which also enters the over 26 and which carries the dummy gage resistance element 84 constituting the resistance $R_4$ exterior to the oven 26. The leadout wires composed of the conductors 86 and 88 are balanced by the equal length of compensating lead wire 90; both the conductors 86 and 88, extending ultimately to opposite ends of the gage 48, and the compensating lead 90 are attached along a portion of their length to the tubular members 74 of the clamping assembly 3, and are so disposed that equal lengths of the lead out wire formed of conductors 86 and 88 and the compensating lead 90 extend within the heated oven 26 during the gage adjustment procedure. This system thus provides that an equal length of wire is in the high temperature area for each of the bridge arms exterior to the indicator 82, i.e. that containing the gage 48 constituting the resistance element $R_1$, and the dummy or compensating gage 84 constituting the resistance $R_4$; thus cancelling the temperature effects on the lead wires 86 and 88. Each of the latter wires 86 and 88 as well as the arms of the compensating lead 90 are of course duly insulated from each other. The conductor 88 is connected to the compensating conductor 90 through the short lead 92 in the SR-4 strain indicator 82. The lead wire 86 is connected to the bridge arm 94 containing the resistance $R_2$ The conductor 90 including the dummy gage 84, constituting the resistance $R_4$, is in turn connected to the arm 96 containing the resistor $R_3$. The two arms 94 and 96 are connected at the terminal 98, at which point the highly sensitive meter branch intercepts the two resistances. The voltmeter-containing branch 100 is connected to the test gage (48) arm constitutin gthe resistance $R_1$ and the dummy gage (84) arm constituting the resistance $R_4$ at the terminal 101 mid-way along the short lead wire 92 connecting the two resistances. The alternating current power source 102 is connected to the bridge within the strain indicator 82 at the terminals 104 and 106 through the lead wires 108 and 110, respectively.

The bridge terminals 104 and 106 represent the power or input connections for energizing the bridge circuit. The SR-4 strain indicator employed is thus seen in the simplified schematic presentation of FIGURE 1 as a conventional Wheatstone bridge wherein the temperature sensitivity of the gage 48 constituting the resistance $R_1$ is measured as it is being adjusted in the oven 26; thus permitting the gage adjustment process to be curtailed when the desired sensitivity is imparted thereto. The resistances $R_2$ and $R_3$ of the arms 94 and 96 respectively are conventional ratio arms and $R_4$ is the compensating or dummy gage 84 whose resistance value is known precisely. Resistance values in the bridge are such that the changes in resistance induced in the gage 48 by the elevated temperatures of the oven 26 are reflected in an imbalance in the bridge and a resultant flow of current across the meter branch 100, which provides the measurement of unmounted sensitivity in the gage 48. It should be noted that the resistance values in the bridge 5 are not critical except that they must be matched and must be of sufficient resistance and wattage to prevent excessive current drain and damage to the resistors. The SR-4 strain indicator is a well-known device widely employed heretofore for the measurement of static strain. This indicator has not, however, been utilized heretofore for the purpose of calibrating, with accuracy the unmounted sensitivity of weldable strain gages of the type described herein.

It should also be noted that suitable observation of the resistance change in the gage filament due to shifting thereof by the procedure herein described can be had by inclusion in the system of the present invention of a Standard Brown Electronic Potentiometer Amplifier (manufactured by the Minneapolis-Honeywell Corporation) and Standard Brown Electronic two-phase motor manufactured by the same corporation or similar devices as described in the copending application of the applicant herein filed on even date herewith and entitled "Improvements in Strain Gages and Methods for the Production Thereof."

Figure 2:
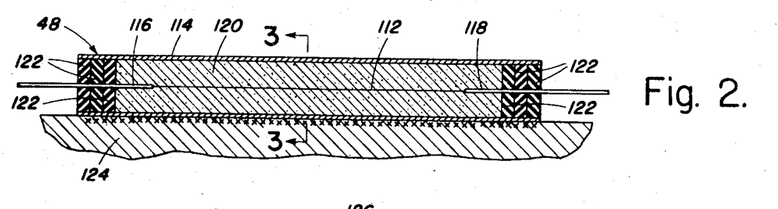
FIGURE 2 is a longitudinal sectional view of a typical strain gage employed in the practice of the invention and shown in operative position with respect to a test specimen.
Figure 3:
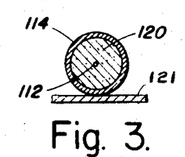
FIGURE 3 is a sectional view taken along line 3—3 of FIGURE 2, illustrating at the same time the preferred modification of the present invention.
Figure 4:
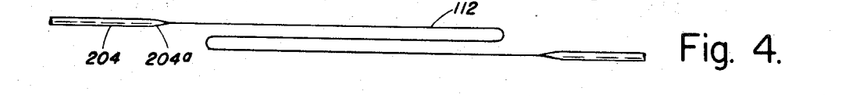
FIGURE 4 is an elevational view of a modified form of resistance element useful in the device of FIGURE 2 as well as in other gage structures of the class employed herein.

The basic embodiment of the strain gage 48 employed in the practice of the present invention is illustrated in FIGURES 2 and 3. Gages of this class are unique in that they are weldably attachable to the test specimen along the entire effective length of the strain-responsive filament contained within the gage. As illustrated in FIGURE 2, the gage comprises a fine strain-responsive resistance wire or filament 112 coaxially disposed in an elongated tube or similar external housing 114 with the ends of the filament wire terminating within the tube. A pair of larger lead wires 116 and 118 are welded, soldered or otherwise attached to the ends of the aforesaid wire filament 112. Alternatively, the lead wires 116 and 118 may be formed integral with wire 112, in a manner hereinafter described, and extend coaxially beyond the respective ends of housing 114. The free ends of the lead wires are adapted to be connected to the aforesaid bridge circuit for measurement. A suitable compactable or compressible mass of solid insulating material 120, such as mica, alumina oxide, thorium oxide, magnesium oxide, magnesium silicate, forsterite ($2MgO_2$), or any of the insulating plastics which are substantially stable at relatively high temperatures, such, for example, as polymerized tetrafluoroethylene, is disposed within the housing 114 surrounding the fine wire or filament 112. A desirable arrangement for positioning of the filament 112 within the gage is seen in FIGURE 4. It has been found that magnesium silicate ground to a fine powder and fired at approximately 1900° F. for one hour provides an excellent material for use in the gages of the invention. Two or more insulating materials of different coefficients of expansion may be combined in proper proportions to give a desired coefficient of expansion approximating that of the material forming external housing 114. A plurality of insulating washers 122 may be disposed over the lead wires 116 and 118 at each end of the housing to retain the insulating material within the housing.

After the insulating material has been placed around the filament section 112 and around at least a portion of the lead wire extensions 116 and 118 as tightly as possible and the insulating washers 122 are placed in position to the open end of the external housing 114, this latter housing 114 is drawn from its original diameter to a smaller diameter in order to compress the insulating material 120, thereby exerting mechanical pressure on the aforesaid washers 122, the insulating material 120 and the resistance wire or filament 112 embedded therein. This results in the resistance element 112 being clamped over its entire length and surface by the radial pressure of the compressed insulating material 120 surrounding it. The insulation is in turn firmly coupled to the inside surface of the external housing 114 by the compressive force exerted against the housing 114 by the insulating material 120. As a direct consequence of this arrangement any movement of the aforesaid housing 114 is transmitted through the compacted mass of insulation 120 to the resistance element 112. At the same time the resistance element 112 is thermally and electrically insulated from the housing 114. Thus, if the external housing 114 is welded to test specimen 124 by small spotwelds (designated by X's in FIGURE 2) or by a continuous weld the entire length of the gage shell in the preferred manner or any shorter length corresponding to the total length of the filament 112 contained therein, and a strain is then introduced into the test specimen 124 causing a modification in its dimensions, the dimensions of the housing 114 will undergo a corresponding modification or deformation which will be transmitted through the compressed insulation 120 to the resistance filament 112 effected a proportionate change in the resistance of the latter element 112.

A preferred commercial embodiment of the gage for use in the present invention involves a modification of the basic gage housing 114, as shown in cross-section in FIGURE 3. This modification comprises simply the addition to the housing 114 of the gage shown in FIGURES 2 and 3, during manufacture, of a thin, flat strip 121 welded to the tubular housing 114 at the bottom thereof by small spot welds or by continuous weld the entire length of the filament 112 or housing 114 or any shorter length corresponding substantially with the effective length of the filament 134, and so disposed as to define an extension beyond the sides thereof to provide flat welding surfaces permitting attachment of the gage to a test specimen without the use of special electrodes.

Of course, a great many other variations in the basic design of the strain gage housing 114 may be effected to facilitate weldable mounting of the gage 48 for general use or for specific applications involving test specimens of irregular surface contours and the like. Thus, flanges or weldable mounting surfaces of the gage housing 114 may be perforated or slotted during manufacture to permit riveting of the gage to a test specimen for improved bonding when mounted by welding or soldering. The housing may also be formed of a single piece of sheet steel or other suitable material by folding to form one flange and a central housing and then welding the free ends together to form the other flange. A further alternative permits constructing the housing 114 of a single piece with but one flange suitable for attachment by welding to a test specimen. Too, the central section of the housing containing the resistance wire and insulating material may be pressed into any desired configuration or creased or crimped at one or more points to provide increased compressive contact following assembly of the gage 48.

Figure 5:
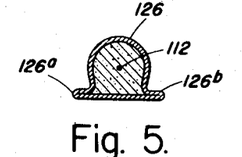
FIGURES 5 and 6 are transverse sectional views illustrating, in cross-section, two modified forms of strain gage embodying the principles of the gages for use in the present invention.
Figure 6:
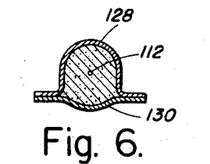

An illustration of a further modification of a gage housing which is intended to facilitate mounting thereof on test specimens is seen in FIGURE 5, and comprises an elongated tubular envelope 126, the upper portion of which is substantially circular. The lower portion of the housing 126 is provided with integrally formed flanges 126a and 126b on both sides of the main circular housing 126 extending transversely to the axis of the tube. In this arrangement, the resistance element 112, insulating material 120 and insulating retainer washers (not shown) are disposed in the housing as in the embodiment of FIGURE 2 and the housing is then crimped or run through a suitable die which gives it the cross-section illustrated in FIGURE 5, and also causes the insulating material 120 to be compressed against the resistance element in the same manner as effected by the drawing operation described in connection with the embodiment of FIGURES 2 and 3. The flanges 126a and 126b are intended to facilitate attachment of the gage to a test specimen by welding. Thus, the two flanges are welded directly to the surface of the test specimen by suitable spaced spot-welds or single continuous linear welds extending along the entire effective length of the gage, i.e. the length of the resistance filament 112 plus any excess thereof deemed necessary or desirable. In a similar manner, FIGURE 6 illustrates a modified cross-sectional configuration wherein two separate sections 128 and 130, each provided with laterally projecting flanges, are welded together or otherwise fastened at the flanged portions so that the resistance element and insulating material are tightly compacted within the housing. Here again, the gage structure can be mounted on a test specimen by welding directly through the flange portions.

Figure 7:
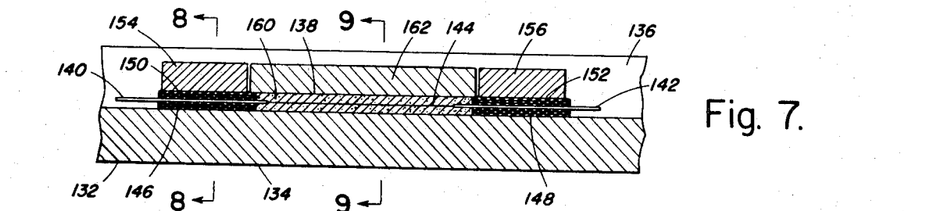
FIGURE 7 is a longitudinal sectional view illustrating another form of strain gage for use in the present invention, and the manner in which the same is attached to a test specimen.
Figures 8, 9:
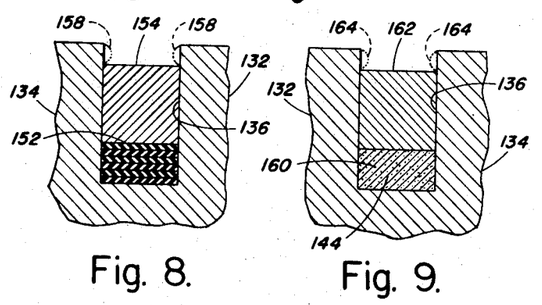
FIGURES 8 and 9 are transverse sectional views taken along lines 8—8 and 9—9, respectively, of FIGURE 7.

FIGURES 7 to 9 inclusive illustrate an embodiment of the strain gage for use herein in which the external housing 132 comprises a rectangular shaped body 134 having an elongated rectangular groove 136 in its surface. A resistance element 138 comprising two relatively heavy electric leads 140, 142 with a fine gage wire 144 bonded between the lead wires is disposed within the groove. Each of the lead wires rests on sheets 146, 148 of suitable insulating material, such as mica. Additional sheets 150, 152 of insulating material are placed on top of each of the lead wires. A pair of small rectangular blocks 154, 156 are disposed over the stacks of sheet mica, respectively. These blocks are forced down on the mica sheets by any suitable means such as hammering and are held in position by deformation of the upper edge of the groove adjacent the upper surface of the blocks, as indicated at 158 by the dotted lines in FIG. 8. A powdered insulating material 160, such as mica, is placed in the groove between the two sheet stacks and tamped firmly into the groove. A bar 162 adapted to fit in the groove is disposed over the powdered mica and is hammered and clamped in position in the manner described for the two small blocks. The dotted lines at 164 of FIG. 9 illustrate how the bar is held in position. With this arrangement the fine wire is firmly clamped in the powdered mica so that the wire resistance will respond to deformation of the body.

In the embodiment shown in FIGS. 7 through 9 the body can either be the test specimen proper or it can form a suitable housing which is adapted to be bonded to a test specimen. In general, this type of structure finds particular application in permanent installations, wherein a continuous strain measurement or similar physical measurement is required during routine operation of the equipment forming the test specimen, such as for cranes, lifts, and the like.

As pointed out hereinbefore, the housings of the strain gages employed in the practice of the present invention are preferably formed of a material which is readily adaptable to bonding by electric resistance welding or sonic welding. On the other hand, it is equally important to successful operation of the gages that the housing be of minimum structural strength so as to reduce its effect on the normal strain characteristics of the test specimen, and to permit it to be deformed readily under stresses occurring within the test specimen. It has been found that housings formed of thin sheet steel are admirably suited for use in the manufacture of weldable strain gages according to the invention and that such housings may be formed in a variety of configurations to facilitate attachment of the gages to a test specimen by welding while at the same time permitting the housings to be formed of minimum structural strength. In adapting the basic structural characteristics of these gages to conventional welding practices, it is important that the gage housing be such that it will permit positioning of the welding electrodes as close as possible to the actual point or points of weld, thereby to insure the shortest possible path for the welding current and substantially localized heating only, of the gage structure.

Figure 10:
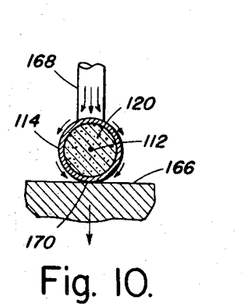
FIGURE 10 is a transverse sectional view illustrating the manner in which a strain gage of the type illustrated in FIGURE 2 can be welded to a metallic test specimen.

For example, with reference to FIG. 10 of the drawings, there is shown in cross-section, the basic gage configuration of FIG. 3 positioned for attachment by welding to a test specimen 166. Current from the welding electrode 168 will flow within the tubular housing 114, as indicated by the small arrows in FIG. 10, entering the test specimen at the weld-point, as indicated by reference numeral 170. Although it has been found from practical experience that it is entirely possible to spot-weld a gage of plain tubular configuration in the manner illustrated, and to obtain accurate test results with gages mounted in this manner, it has also been found that since the welding electrode 168 must be positioned relatively remote from weld-point 170 in this type of welding operation, unless one employs a special electrode that is adapted to fit around the tubular housing of the gage there is some danger of damaging the gage through overheating of the tubular walls. Furthermore, it is difficult in this type of welding operation to obtain a high concentration of force at the welding point because of the possibility of crushing the relatively thin tubular housing under the pressure required.

As explained hereinbefore, in the gage structures illustrated in FIGURES 3, 5, and 6, provision is made for attachment of the gage by welding or spot-welding to a test specimen by means of the strip 121 in FIGURE 3 or flanges 126a and 126b formed integrally on each side of the lower portion of the housing 126 as seen in FIGURES 5 and 6. With this type of gage housing, the welding electrode can be positioned directly over the respective flanges without excessive heating of the remaining portions of the gage housing and without danger of crushing the central section of the gage housing containing the resistance element. It sometimes occurs with this type of structure (FIG. 5), however, that in the die operation or crimping operation employed to compress the insulation about the gage wire or wires and for forming flanges 126a and 126b, a portion of the insulation may be compressed between the flange walls, thereby forming a relatively high resistance path for welding current passing through the flanges to the test specimen.

Figure 11:
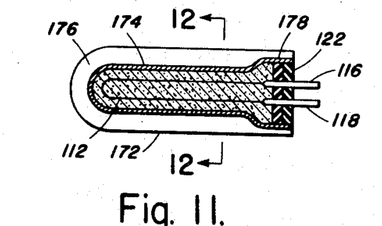
FIGURE 11 is a view, partly in top plan and partly in horizontal section, of a further embodiment of a strain gage which can be employed in the practice of the present invention.
Figure 12:
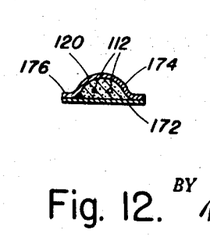
FIGURE 12 is a transverse sectional view taken along line 12—12 of FIGURE 11.

For certain applications, it is desirable to terminate the gage lead-in wires at one end of the gage housing and in FIGS. 11 and 12, there are shown in sectional-plan and cross-sectional views, respectively, a gage of this type. With reference to FIGS. 11 and 12, the gage comprises a substantially flat bottom section 172 and a semi-tubular upper section 174 defining substantially the entire housing for the resistance wire 112 and insulating material 120. The upper section 174 is closed on three sides and is provided with flange sections 176 which are welded or otherwise attached on three sides to the bottom section 172. The gage is formed in the manner described in copending application Ser. No. 754,956 "Improvements in Strain Gages and Installation of the Same" filed Aug. 14, 1958, by the applicant herein. The resistance wire 112 is looped within the housing as shown in FIG. 11 and is joined to the separate lead-in wires 116 and 118 within the housing, and these leads are then extended externally of the housing at the single open end through suitable insulating washers or retainers 122. The upper section 174 of the gage housing may be dished to a greater depth over the portion housing the lead-in wires, as indicated by reference numeral 178 in FIG. 11, to accommodate these wires.

An additional and significant feature of the strain gages of the present invention is their long-term temperature stability. Since temperature compensation and long-term stability against drift are not always directly related, however, it is desirable in certain instances to forego the ultimate in sensitivity adjustment or temperature compensation to affect enhancement in extended stability of the gage; thus inhibiting excessive drift therein when maintained at a constant temperature for an extended period of time, e.g. several weeks. It has been found, however, that curing of the gage in a suitable manner even at the desired adjustment temperature tends to impart a substantial long-term stability thereto. Thus, gages in which the filament is formed of Evenohm wire, of 0.005 to 0.001 in. thickness, undergoing a normal curing cycle of approximately ten minutes' duration at an oven temperature in the range of 800° F. to 900° F. and preferably of approximately 850° F. for downward adjustment of temperature sensitivity possess a substantial stability over extended periods up to 700° F.

The temperature range at which downward adjustment occurs is rather limited, i.e. 800° F. to 900° F. The procedure is, in addition, relatively slow. However, long term stability to drift at temperatures in excess of 700° F., e.g. up to 900° F., is imparted to the gages of the present invention most desirably at the aforesaid adjustment oven temperature of 850° F. by simple prolongation of the curing cycle, i.e. approximately one to two hours. The upward adjustment in temperature occurs at oven temperatures in the range of 900° F. to 1500° F. and preferably from 1100° F. to 1200° F. Significant, but lessened long-term stability to drift is attained by a similar prolongation of the curing period at oven temperatures in excess of 1500° F., i.e. up to approximately 2000° F. It will be evident that the resistance element or elements 46 of the oven 26 must be capable of imparting to the oven 26 temperatures within these aforesaid ranges, that is temperatures sufficiently high to produce the desired shift in bridge balance resistance and temperature sensitivity, and sufficiently low so that this shift is gradual enough to permit observation and shut-off at a desired value. Further provision for securing a long-term stability against drift is had if the final adjustment temperature compensation is made by lowering the sensitivity thereof to the desired value rather than raising it. This, of course, does not obviate use of the technique wherein the adjustment of the gage is raised to the desired sensitivity value, a procedure which is both conveniently and rapidly performed, but it suggests that it is better to overshift the adjustment values upward and subsequently make the final adjustment in a downward shift.

As noted hereinabove, the sensitivity thus imparted to the unmounted gage by these above described procedures is a significant and a meaningful one permitting an accurate measurement thereof before use which has been hitherto unknown in strain gage construction. The outer shell of the gages of the class described hereinabove is significant in relation to the instant methods of adjustment and measurement, particularly as regards the temperature coefficient of expansion of the shell or outer housing. Thus, it will be evident that this housing is not a major factor when a gage is mounted on a test specimen since being the weaker of the two in construction, the gage shell follows the underlying structure in the same manner as it would during a change in structure induced by stress. However, when the gage is unmounted, this same shell or housing is inhibited by the underlying structure of a test specimen, but provides a significant strength to yield a meaningful unmounted sensitivity in the gage itself. Thus, in effect, the gage shell or housing replaces the test specimen in the unmounted state and in this manner provides an ideal structure for obtaining accurate and repeatable unmounted sensitivities. While, in the unmounted state the gage housing resists bending and is strong enough to be a controlling factor in the overall expansion rate of the gage, rendering as noted, an accurate unmounted sensitivity thereto, the relation between unmounted and mounted sensitivity must be known. Thus, for example, where 304 stainless steel is employed in the gage housing unmounted and mounted sensitivities should be substantially identical, since the thermal coefficient of expansion of the gage housing and therefore of the unmounted gage is the same as the test specimen. This being a desirable condition, it will be evident that the unmounted sensitivity of a gage should be as nearly zero as possible where gage shell and test metal are the same, so that its mounted sensitivity is as low as possible. Where, then, gages are made of the same metal as the test specimen, this condition is substantially achieved. However, where gages are made, for example, of 304 stainless steel and the test specimens on which these gages are to be mounted are made of different metals, the unmounted sensitivity of the gages will have to be adjusted in a substantially direct ratio to the difference in the thermal coefficients of expansion of the gage and test specimen. Illustratively, metals having a coefficient of expansion higher than that of 304 stainless steel require a lowering of the unmounted sensitivity, i.e., a negative unmounted temperature sensitivity; and metals with a lower thermal coefficient of expansion require a more positive unmounted sensitivity. To illustrate further, if a gage with an unmounted sensitivity of zero were mounted on aluminum, the gage would be stretched more in the mounted position with increasing temperature because of the higher rate of expansion of aluminum than that of the gage housing made, again illustratively, of 304 stainless steel. Thus, is would have a high positive sensitivity when welded to aluminum. To obviate this high positive sensitivity, a proper gage to be used on the aluminum should have a compensation of higher negative unmounted sensitivity. Specifically, if a gage for a 304 stainless steel housing is to be used on a test specimen constructed of 1500 aluminum, the unmounted sensitivity of the gage should be approximately 1500 micro-inches/ in/° F. for a temperature change from 100° F. to 600° F., a difference of 500° F., or an average sensitivity of 3 micro-inches/in/° F.

When the gage is to be used on 4130 steel the unmounted sensitivity should be approximately +1000 micro-in./ in./° F. for the same 500° F. temperature change, or an average of +2 micro-in./in./° F. These figures indicate a difference in the average thermal coefficients of expansion of aluminum and 4130 steel over this range of 5 parts per million ° F. (a difference between —3 and +2 micro-in./in./° F.) which is in substantial agreement with known figures for these coefficients in these temperature ranges.

Since there is a relationship between coefficient of expansion and unmounted sensitivity, this coefficient, if known, can be used to predict the unmounted sensitivity required. In addition, the gage can be used to measure coefficient of expansion. A zero sensitivity in the mounted gage can be attached to the material in question. The mounted sensitivity in micro-in./in./° F. is then a good indication of the difference in expansion coefficients between the 304 stainless shell of the gage and the material in question. If the thermal coefficient of expansion of the 304 is known then the coefficient of expansion of the material to which it is attached is readily computed. Of course, the coefficient for 304 stainless steel can be accurately determined by mounting gages on materials with known thermal coefficients of expansion.

The effectiveness of the compensation may be checked by mounting gages with known unmounted sensitivities on a sample piece of the material to be tested and plotting apparent strain against temperature. Two or three checks may be made before the proper unmounted sensitivity is arrived at. For example, if, on the first attempt, a gage with an unmounted sensitivity of +900 micro-in./ in./° F., for a change of 500° F., is mounted and found to have a sensitivity of —200 micro-in./in./° F. for the same temperature change; then, on the next attempt a gage with an unmounted sensitivity of +1100 micro-in./in./ 500° F. may be tried, i.e. an additional sensitivity of +200 micro-in./in./° F. to counteract the previous —200 micro-in./in./° F. in the first mounted gage. The following is a table showing approximate values of unmounted sensitivities for some common metals:

TABLE I

|  | Micro-in./in./500° F. | Micro-in./in./1° F. |
| --- | --- | --- |
| Titanium | +1,600 | +3 |
| 4130 Steel | +1,000 | +2 |
| 304 Stainless | Zero | --- |
| Aluminum | —1,500 | —3 |
| Magnesium-Thorium | —2,000 | —4 |

The approximate thermal coefficients of expansions of these metals are listed below:

TABLE II

|  | Parts/Million/° F. (micro-in./in./° F.) | Difference in parts/million/° F. (micro-in./in./° F.) from 304 Stainless Steel |
| --- | --- | --- |
| Titanium | +6 | —3 |
| 4130 Steel | +8 | —2 |
| 304 Stainless | +9 | --- |
| Aluminum | +13 | +4 |
| Magnesium-Thorium | +15 | +6 |

It can be seen that, if 304 stainless is employed in the gage shell or housing the unmounted sensitivities are in approximately inverse ratio to the thermal coefficients of expansion.

It should be noted that some alloys possess a wide variety of thermal coefficients of expansion depending on the heat treatment. Thus, an error of over 1000 micro-in./ in./° F. for a 500° F. change can be introduced by this factor so that there is no substitute for using a sample of material which is identical to the test structure, not only in composition but in heat treatment as well, on which to mount and calibrate gages to arrive at the proper unmounted sensitivity.

It will also be noted, that there is an ignored change in the bridge balance for a very short period after the gage is subjected to the high oven heat. This represents the shift in resistance caused by the actual bringing up to temperature of the filament. It is not a permanent change and will reverse if the temperature is dropped back immediately, i.e. returned to the original room temperature conditions. The permanent change in resistance which occurs after the gage has attained the desired temperature in the oven 26 is that which is significant. This is supported by an observation at ambient temperature of the bridge balance before and after each curing cycle.

It is noted that the oven temperatures used for upward shifting of gage sensitivity can also be employed in effecting a downward shift in gage sensitivity. Thus, in increasing the oven temperature to effect an upward shift in sensitivity the gage filament must pass through the lower temperature range referred to above, e.g. 800° F. to 900° F., and if this transition is made sufficiently gradually, the increase in resistance will be effected in this lower range. Subsequently, as the temperature gradient is increased in the higher ranges, a reversal in sensitivity will occur. It is also noted that the weldable strain gage employed herein can be used for temperature measurement by adjustment of temperature sensitivity to a known high value rather than to a low value.

Thus, it will be evident that there is provided by the present invention, a temperature compensated weldable wire resistance strain gage accurately adjusted and measured in its unmounted state, as well as novel and unique methods for the production thereof.

What is claimed is:

1. Apparatus for producing inherent temperature compensation within an unmounted strain gage composed of a strain responsive filament coupled through an electrical insulating material to a metallic support; said apparatus comprising means for establishing said strain gage at an elevated temperature; means for sensing and indicating the temperature sensitivity of said gage at said elevated temperature, said sensing and indicating means including first lead wires connecting said resistance filament to said indicating and sensing means, and a second lead wire of equal length and parallel to said first lead wires and connected at both ends to said indicating and sensing means, said second lead wire being adapted to cancel changes in resistivity of said first lead wires due to said elevated temperature, and heating means for shifting said temperature sensitivity with reference to its indicated value.

2. Apparatus for effecting the temperature compensation of a weldable strain gage composed of a strain responsive resistance filament coupled through an electrical insulating material to a metallic support; said apparatus comprising securement means for disposing said gage in a fixed position; an oven; means for heating said oven to elevated gage adjusting temperature; means for investing, and removing said gage in said oven; means for measuring the change in sensitivity of the strain responsive resistance filament of said gage, said sensitivity measuring means including first lead wires connecting said resistance filament to said sensitivity measuring means, and a second lead wire of equal length and parallel to said first lead wires and connected at both ends to said sensitivity measuring means, said second lead wire being adapted to cancel changes in resistivity of said first lead wires due to said elevated temperature; and an electrical current source provided exterior to said oven and connected through a circuit with the aforesaid resistance filament, said sensitivity measuring means being connected in parallel therewith.

3. Apparatus for effecting the temperature compensation of a weldable strain gage composed of a strain-responsive resistance filament coupled through an electrical insulating material to a metallic housing, a thin, substantially flat metallic strip extending the length of said housing and welded thereto, and so disposed as to define an extension beyond the sides thereof to provide flat welding surfaces for effecting attachment of the gage to a test specimen; said apparatus comprising securement means for disposing said gage in a fixed position; at least one oven unit; means for investing said gage therein; heating means in said oven sufficient for permitting measurement of the change in sensitivity of the strain responsive resistance filament of said gage and including a sensitivity measuring electrical current source provided exterior to said oven and connected through a circuit with the aforesaid resistance filament; said circuit including a compensating wire extending into said oven and adapted to compensate for changes in resistivity of said circuit except for said resistance filament; said sensitivity measuring means being connected in parallel to said circuit.

4. Apparatus for effecting the temperature compensation of a weldable strain gage composed of a strain-responsive resistance filament coupled through an electrical insulating material to a metallic housing, a thin, substantially flat metallic strip extending the length of said housing and welded thereto, and so disposed as to define an extension beyond the sides thereof to provide flat welding surfaces for effecting attachment of the gage to a test specimen; said apparatus comprising securement means for disposing said gage in a fixed position, an oven; means for heating said oven to a temperature within the range of 800° F. to 2000° F.; means for investing and removing said gage in said oven; and means for measuring the change in sensitivity of the strain responsive filament of said gage and including an electrical current source provided exterior to said oven and connected through a circuit with the aforesaid resistance filament; said sensitivity measuring means being connected in parallel therewith; and with a compensating resistor also connected to said circuit exterior to said oven via two wires in series with the aforesaid gage filament; one of said wires extending into said oven and acting to compensate for changes in resistivity of said circuit except for said resistance filament.

5. Apparatus for effecting the temperature compensation of a weldable strain gage composed of a strain-responsive resistance filament coupled through an electrical insulating material to a metallic housing, a thin, substantially flat metallic strip extending the length of said housing and welded thereto, and so disposed as to define an extension beyond the sides thereof to provide flat welding surfaces for effecting attachment of the gage to a test specimen; said apparatus comprising securement means for disposing said gage in a fixed position; an oven; means for heating said oven to an elevated temperature sufficient after a period of at least ten minutes to effect upward and downward adjustments in sensitivity of said gage filament; means for investing and removing said gage in said oven; means for measuring the sensitivity of the strain responsive resistance filament of said gage and changes therein due to the adjustment temperatures imparted to said filament by said oven heat; and an electrical current source provided exterior to said oven, and connected through a circuit with the aforesaid resistance filament; said sensitivity measuring means being connected in parallel therewith, and with a compensating resistor also connected to said circuit exterior to said oven via two wires in series with the aforesaid gage filament, one of said wires extending into said oven and acting to compensate for changes in resistivity of said circuit except for said resistance filament.

6. Apparatus for effecting temperature compensation of an electrical resistance strain gage having a strain-responsive resistance filament comprising:
an oven;
means securing said gage and capable of investing and removing said gage from said oven;
circuit means for measuring the sensitivity of said filament to elevated temperatures provided by said oven, said circuit means comprising:
a bridge circuit having said filament as $R_1$ and a compensating resistor as $R_4$, one of the wires connecting said compensating resistor to said bridge passing into and out of said oven and acting to compensate for changes of resistivity of said circuit due to temperature changes except for said filament.

References Cited
UNITED STATES PATENTS

| | | | |
|---|---|---|---|
| 2,609,644 | 9/1952 | Brown et al. | 29—155.62 |
| 2,994,847 | 8/1961 | Vodar | 29—155.5 |

LOUIS R. PRINCE, *Primary Examiner.*

S. C. SWISHER, *Assistant Examiner.*